(12) United States Patent
Sun (10) Patent No.: US 6,538,825 B1
(45) Date of Patent: Mar. 25, 2003

(54) ZOOM LENS

(75) Inventor: Chia-Shen Sun, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 45 days.

(21) Appl. No.: 09/908,896

(22) Filed: Jul. 20, 2001

(30) Foreign Application Priority Data

Apr. 12, 2001 (TW) ........................................ 90108730 A (51) Int. Cl.[7] ............................................... G02B 15/14
(52) U.S. Cl. ........................ 359/687; 359/684; 359/686
(58) Field of Search ................. 359/683, 684, 359/686, 687

(56) References Cited

U.S. PATENT DOCUMENTS

| | | | |
|---|---|---|---|
| 4,701,034 A | 10/1987 | Mihara | 359/688 |
| 4,859,042 A | 8/1989 | Tanaka | 359/684 |
| 5,719,708 A * | 2/1998 | Nagaoka | 359/687 |
| 6,185,048 B1 * | 2/2001 | Ishii et al. | 359/687 |
| 6,353,506 B1 * | 3/2002 | Ohashi | 359/687 |
| 6,414,799 B1 * | 7/2002 | Uzawa et al. | 359/687 |

* cited by examiner

Primary Examiner—Georgia Epps
Assistant Examiner—David N. Spector
(74) Attorney, Agent, or Firm—Birch, Stewart, Kolasch & Birch, LLP (57) ABSTRACT

The invention relates to a zoom lens including four lens groups. Starting from the side near objects, the first lens group is a positive refractive power lens group, the second a negative refractive power lens group, the third a positive refractive power lens group, and the fourth a positive refractive power lens group. When the zoom lens varies from the short focal length (wide angle) to the long focal length (telephone lens), the first lens group is fixed, the second lens group is moved from the object plane (closest to the object on the lens) to the image plane, the third and the fourth lens groups are independently moved from the image plane to the object plane to compensate for the image plane shift of the second lens group. Therefore, a clear image can be formed on the image plane even when the zoom lens focuses on objects at different distances. Each of the third and the fourth lens groups contains at least on aspherical lens.

10 Claims, 9 Drawing Sheets

ZOOM LENS

BACKGROUND OF THE INVENTION

1. Field of Invention

The invention relates to a zoom lens used in photographic deices, such as digital cameras, and, in particular, to a zoom lens with both merits of compact size and high resolution.

2. Related Art

As the manufacturing techniques of CCDs (Charge-Coupled Device) with more than two million pixels are becoming better, a zoom lens with higher resolution for the digital camera is then demanded. One also wants to lower the production cost for zoom lens and to shorten the length of zoom length. However, the previous patents referring to zoom lens proposed for the digital camera, such as the U.S. Pat. No. 4,701,034 and U.S. Pat. No. 4,859,042, show numbers of lenses, heavy weight, and long length.

SUMMARY OF THE INVENTION

The invention provides a zoom lens that has a more compact size and satisfies the requirement of high resolution.

The zoom lens disclosed herein is designed into a frame of four lens groups and aspherical lenses are used in lens groups. Starting from the side near objects, the first, the second, the third, and the fourth lens groups are the ones with positive, negative, positive, and positive refractive power, separately. When the zoom lens varies from the short focal length to the long one, i.e., wide angle to telephoto lens, the first lens group is fixed, the second lens group is moved from the object plane (closest to the object on the lens) to the image plane, the third and the fourth lens groups are independently moved from the image plane to the object plane to compensate for the image plane shift of the second lens group. Therefore, a clear image can be formed on the image plane even when the zoom lens focuses on objects at different distances. Each of the third and the fourth lens groups contains at least one aspherical lens. When the zoom lens varies its focal length from a shorter one (wide angle) to a longer one (telephoto lens), the distortion is less than 2%. This satisfies the optical requirement of high-resolution zoom lens for a digital camera.

BRIEF DESCRIPTION OF THE DRAWINGS

The present invention will become more fully understood from the detailed description given herein below illustration only, and thus are not limitative of the present invention, and wherein.

DETAILED DESCRIPTION OF THE INVENTION

Figure 1:
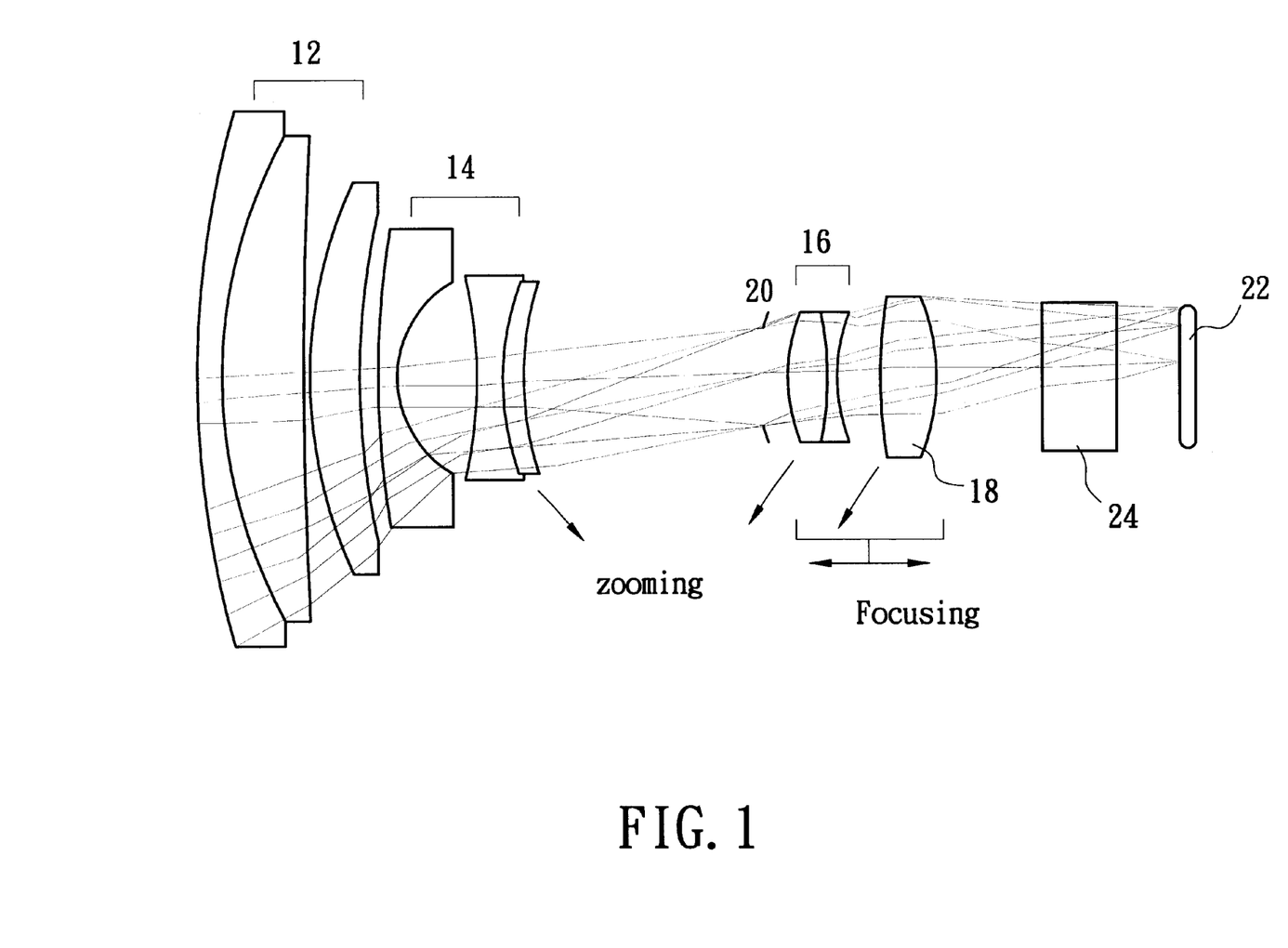
FIG. 1 is a schematic view of the disclosed zoom lens in the wide range.

As shown in FIG. 1, starting from the object plane (closest to the object to be shot, the left hand side in the drawing), the disclosed zoom lens is composed of the first lens group 12, the second lens group 14, the third lens group 16, and the fourth lens group 18. The serial lens groups are the ones with positive, negative, positive, and positive refractive power, respectively.

When the zoom lens varies from the short focal length to the long one, i.e., wide angle to telephoto lens, the first lens group 12 is held fixed, the second lens group 14 is moved from the object plane (namely, to the right in the drawing) to the image plane (where the image of the object is located), the third lens group 16 and the fourth lens group 18 are independently moved from the image plane to the object plane (to the left in the drawing) to compensate for the image plane shift of the second lens group 14. Thus, a clear image can be formed on the image plane all the time. That is, the present invention makes use of the second lens group 14 to adjust the variation in the focal length (from wide angel to telephoto lens). In addition, to make the compensation for the image plane shift of the second lens group 14 the third lens group 16 and the forth lens group 18 will be moved independently. Hence, the image can be always clearly formed on the image plane. The image is formed on a sensor (a CCD 20 or a CMOS sensor and the following description will use the CCD 20 as an example).

To make the size of the zoom lens more compact, each of the third lens group 16 and the fourth lens group 18 contains an aspherical lens. The aspherical lens can be expressed by the following formula:

$$Z = \frac{cy^2}{1 + \sqrt{1 - (1+k)c^2y^2}} + A_4 y^4 + A_6 y^6 + A_8 y^8 + A_{10} y^{10},$$

where y is perpendicular optical axis of the aspherical lens,
  Z is the axial thickness of the aspherical surface at the height y,
  c is the curvature at the vertex of the aspherical surface,
  k is the conic constant of the lens,
  $A_4$, $A_6$, $A_8$, and $A_{10}$ are coefficients of the aspherical lens for higher order terms, 4th, 6th, 8th, and 10th, respectively.

By the use of aspherical lens in this design the number of lenses used is then greatly reduced. As shown in the drawing, one embodiment of the invention only requires nine lenses, whereas the normal spherical lens design needs at least 12 to 13 lenses in order to meet the requirement of 3× high resolution camera zoom lens. By the way, it results in shortening the length of the disclosed zoom lens.

If a remarkable axial color aberration is caused by a zoom lens, it often cannot meet the requirement of high-resolution image for digital cameras. There is an effective way to reduce the axial color aberration due to the variation in the focal length of the zoom lens. That is to design the first lens group 12 and the second lens group 14 to be independent to cut down the axial color aberration. As well as the third lens group 16 and the fourth lens group 18 to compensate for the redundant axial color aberration. Therefore, the variation range of the average Abbe number for the positive lenses in the first lens group 12, for the negative lenses in the second lens group 14, and for the positive lenses in the fourth lens group 18, respectively denoted as $vp1_{avg}$, $vn2_{avg}$, and $vp4_{avg}$, have to satisfy the following conditions:

$$50 \leq vp1_{avg} \leq 65,$$
$$50 \leq vn2_{avg} \leq 75,$$
$$52 \leq vp4_{avg} \leq 75.$$

On the other hand, to make the size of the zoom lens more compact and back focal length longer for accommodating an OLPE (Optical Low Pass Filter) 24 and a CCD 22, the variation range of the transverse magnification for the second, the third, and the fourth lens groups have to satisfy the following conditions:

$$-1.15 \leq \beta 2_{wt} \leq -0.45,$$
$$1.5 \leq \beta 3_{wt} \leq 2.15,$$
$$-0.35 \leq \beta 4_{wt} \leq -0.2$$
$$1.52 \leq \beta 4_1/\beta 4_w \leq \beta 2_{t/\beta 2w} \leq 2.5$$

where $\beta 2_{wt}$, $\beta 3_{wt}$, and $\beta 4_{wt}$ denote the variation range of the transverse magnification when the focal length of the lens group varying from the shortest to the longest for the second lens group 14, for the third lens group 16, and for the fourth lens group 18, respectively, $\beta 2_1/\beta 2_w$ and $\beta 4_1/\beta 4_w$ represent the ratio of the transverse magnification at the shortest focal length to that at the longest focal length for the second lens group 14 and for the fourth lens group 18 separately.

To facilitate the assembly of the zoom lens, cemented lenses are provided in the designs of the first lens group 12, the second lens group 14, and the third lens group 16. To correct the spherical aberration, the cemented lens in the third lens group 16 contains an aspherical surface. A stop 20 is provided between the second lens group 14 and the third lens group 16. When the focal length of the zoom lens changes, the relative position of the stop 20 and the third lens group 16 is held fixed. To improve the distortion, the fourth lens group 18 contains at least one aspherical surface.

With reference to FIG. 1, at the wide range, the disclosed zoom lens focuses at different distances by independently moving the third lens group 16 and the fourth lens group 18, holding the relative position of the stop 20 and the third lens group 16 fixed. The OLPF 24 is used to avoid the aliasing effect, deteriorating the picture quality, on the image plane of the CCD 22 caused by high spatial frequencies.

Figure 2:
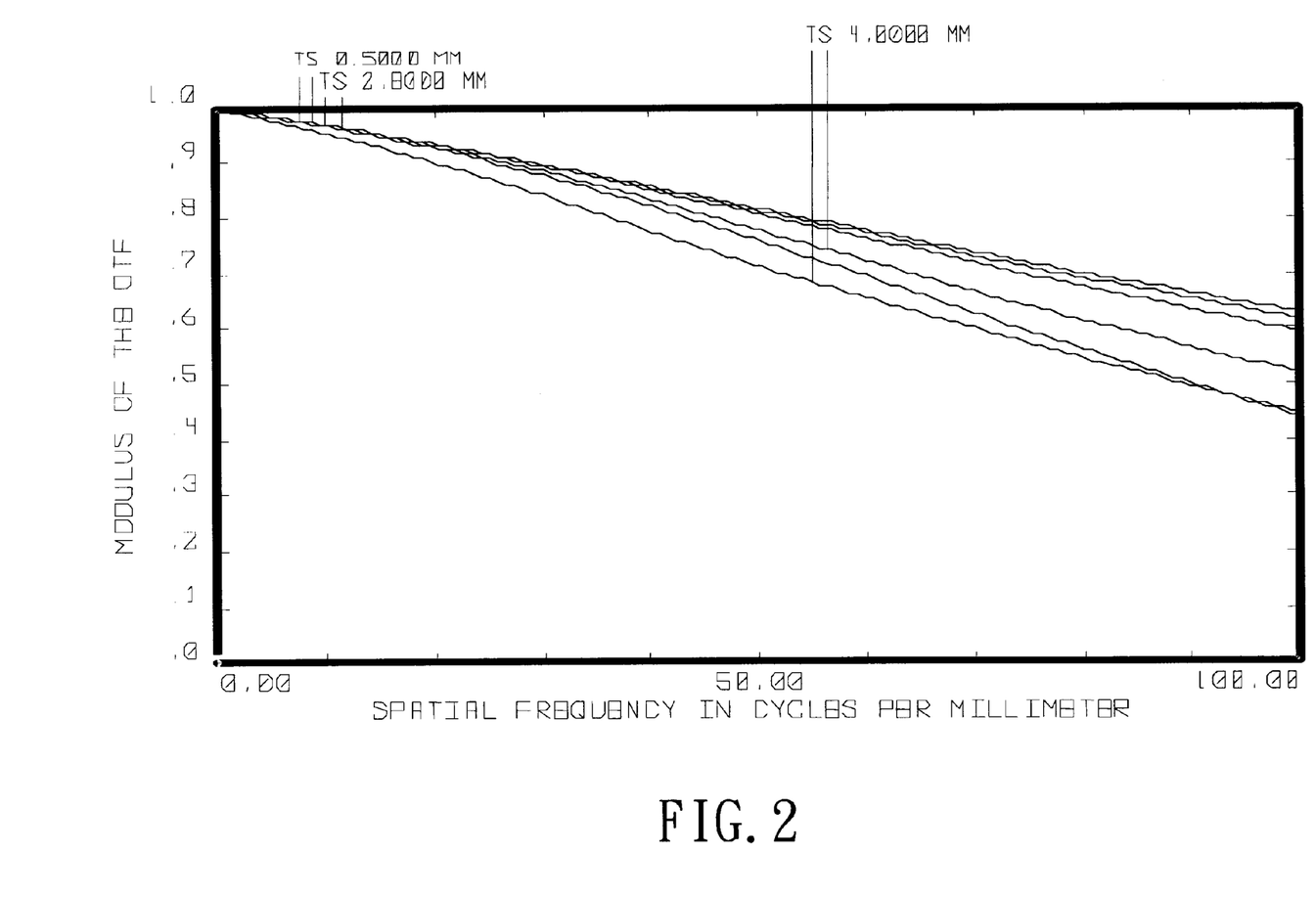
FIG. 2 is a MTF diagram of the disclosed zoom lens in the wide range.
Figure 3:
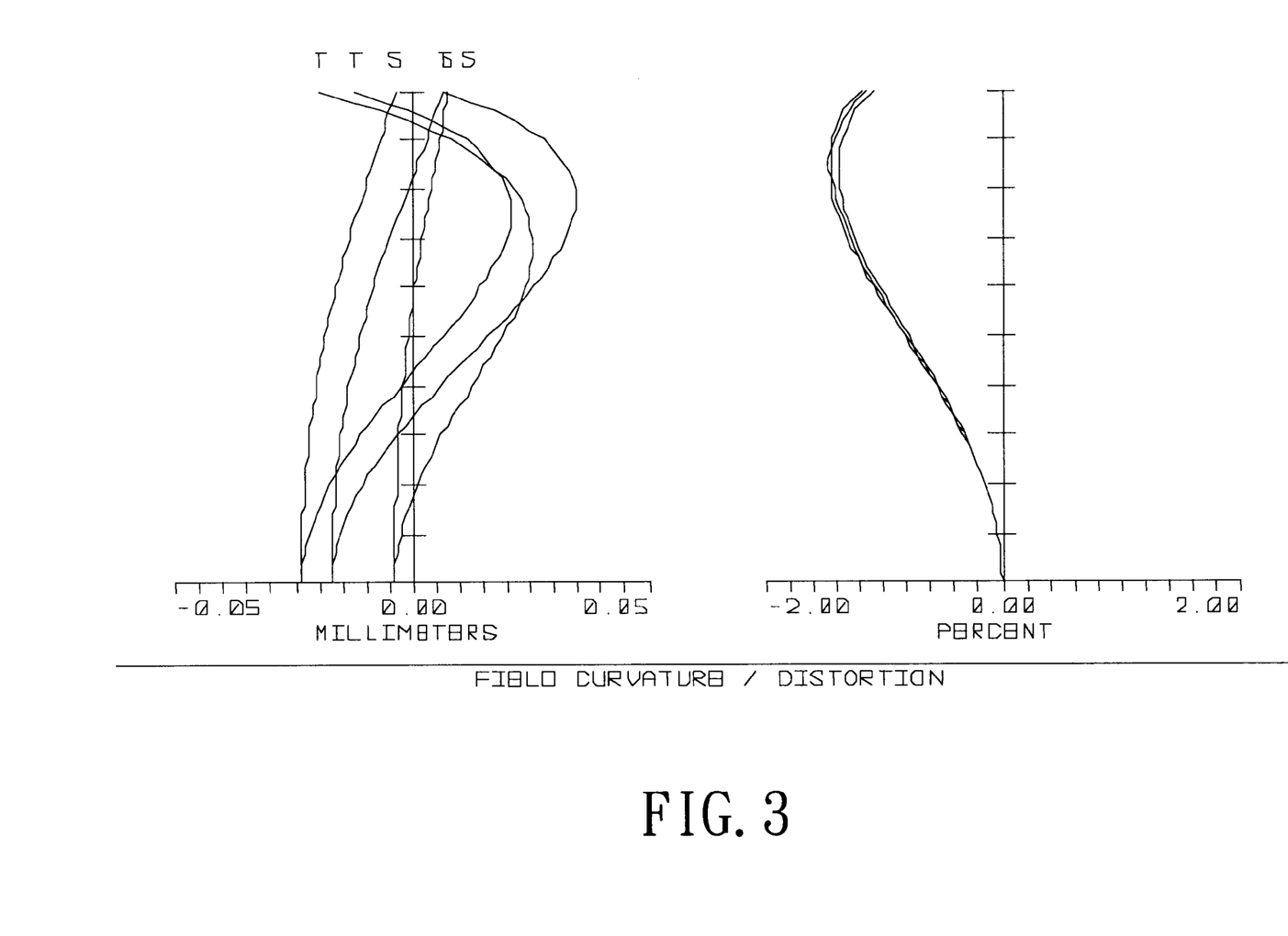
FIG. 3 is the field and distortion diagrams of the disclosed zoom lens in the wide range.
Figure 4:
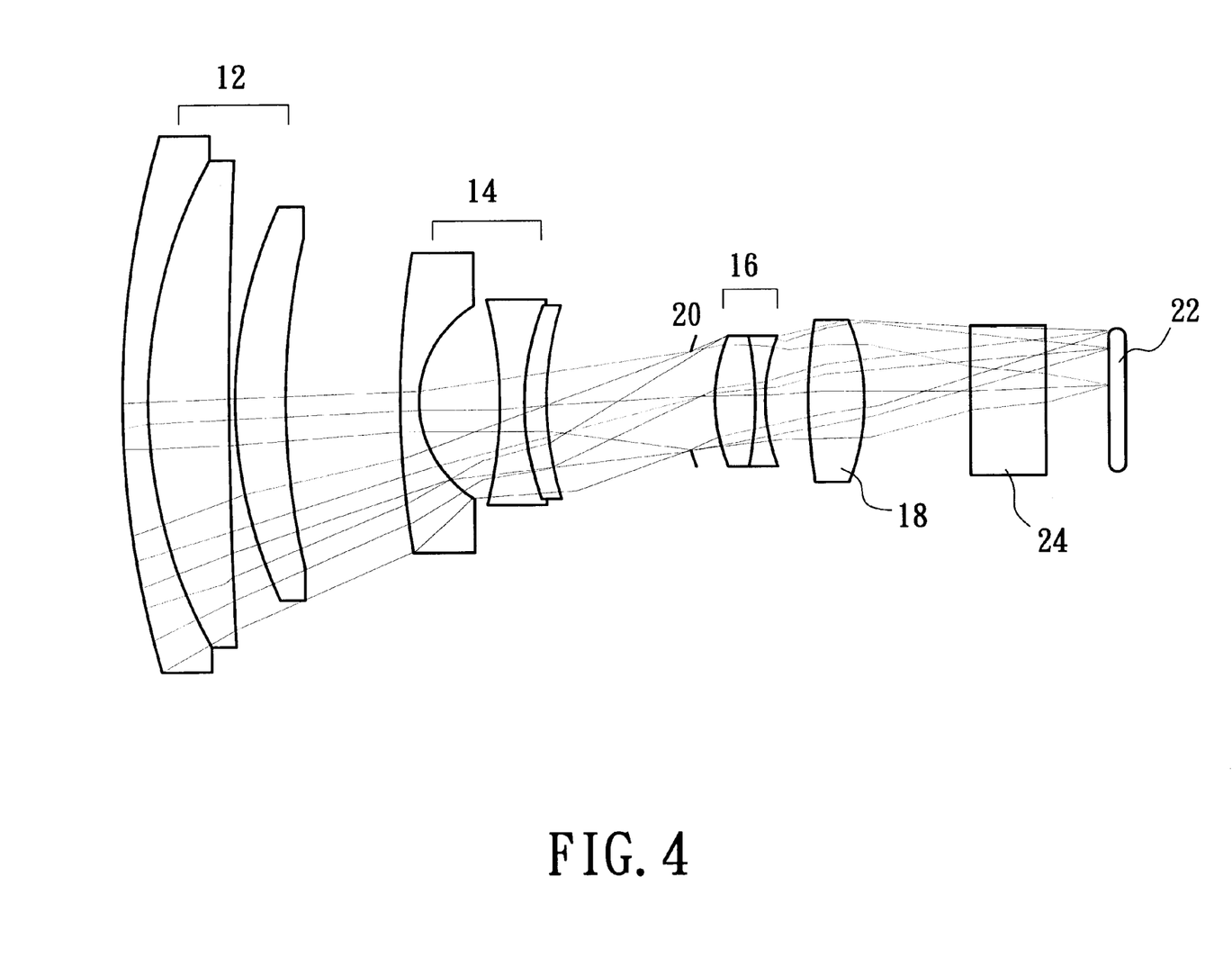
FIG. 4 is a schematic view of the disclosed zoom lens in the medium range.
Figure 5:
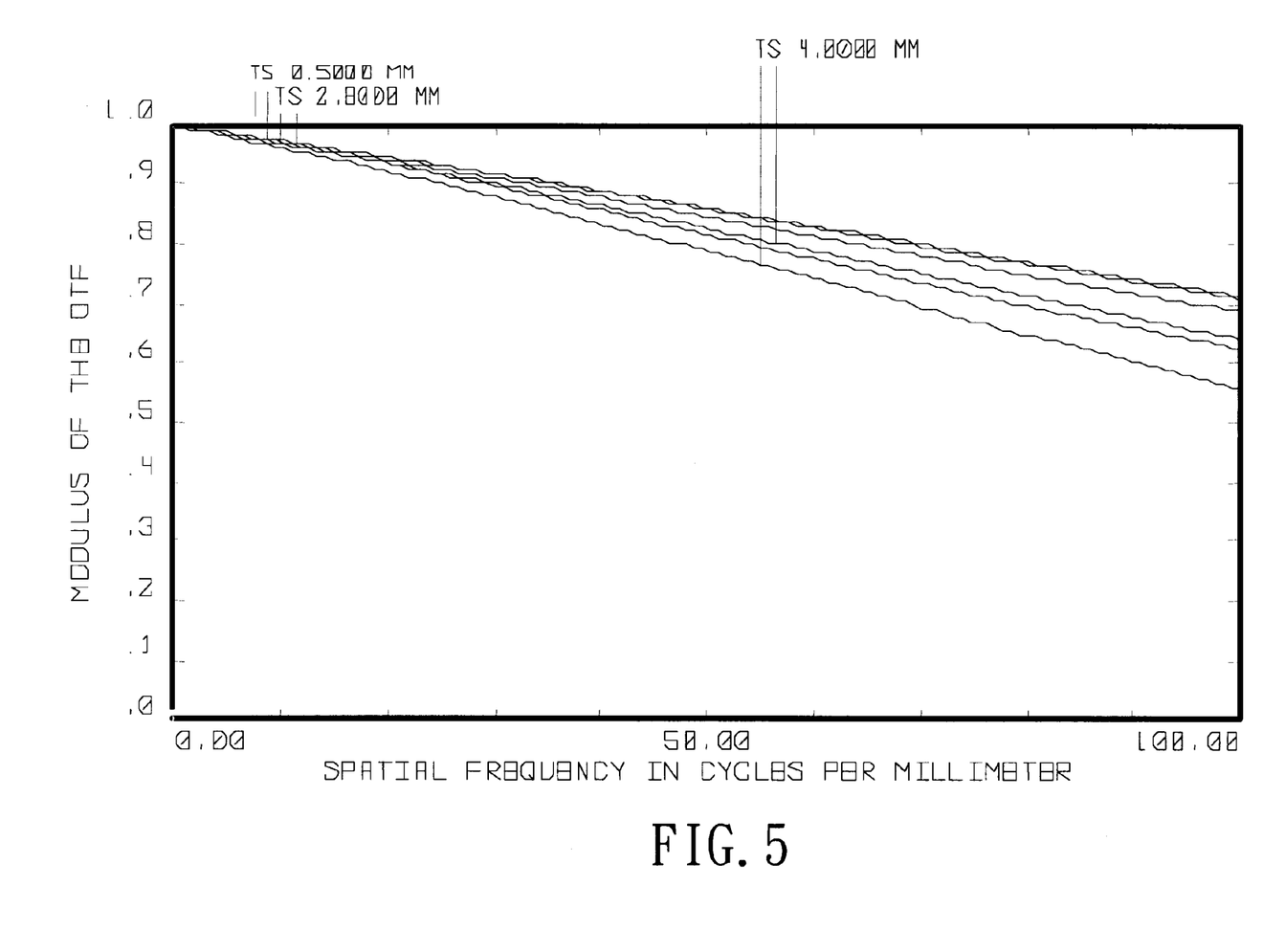
FIG. 5 is a MTF diagram of the disclosed zoom lens in the medium range.
Figure 6:
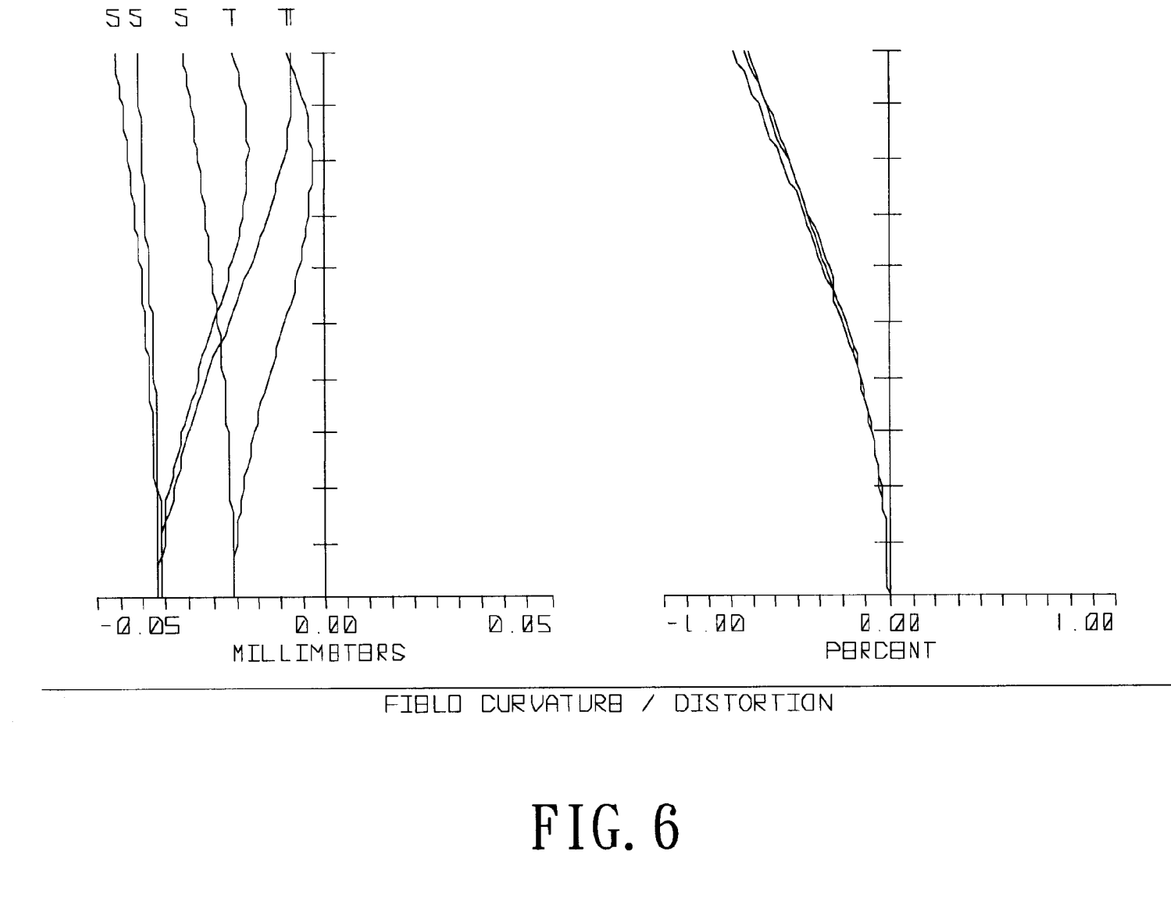
FIG. 6 is the field and distortion diagrams of the disclosed zoom lens in the medium range.
Figure 7:
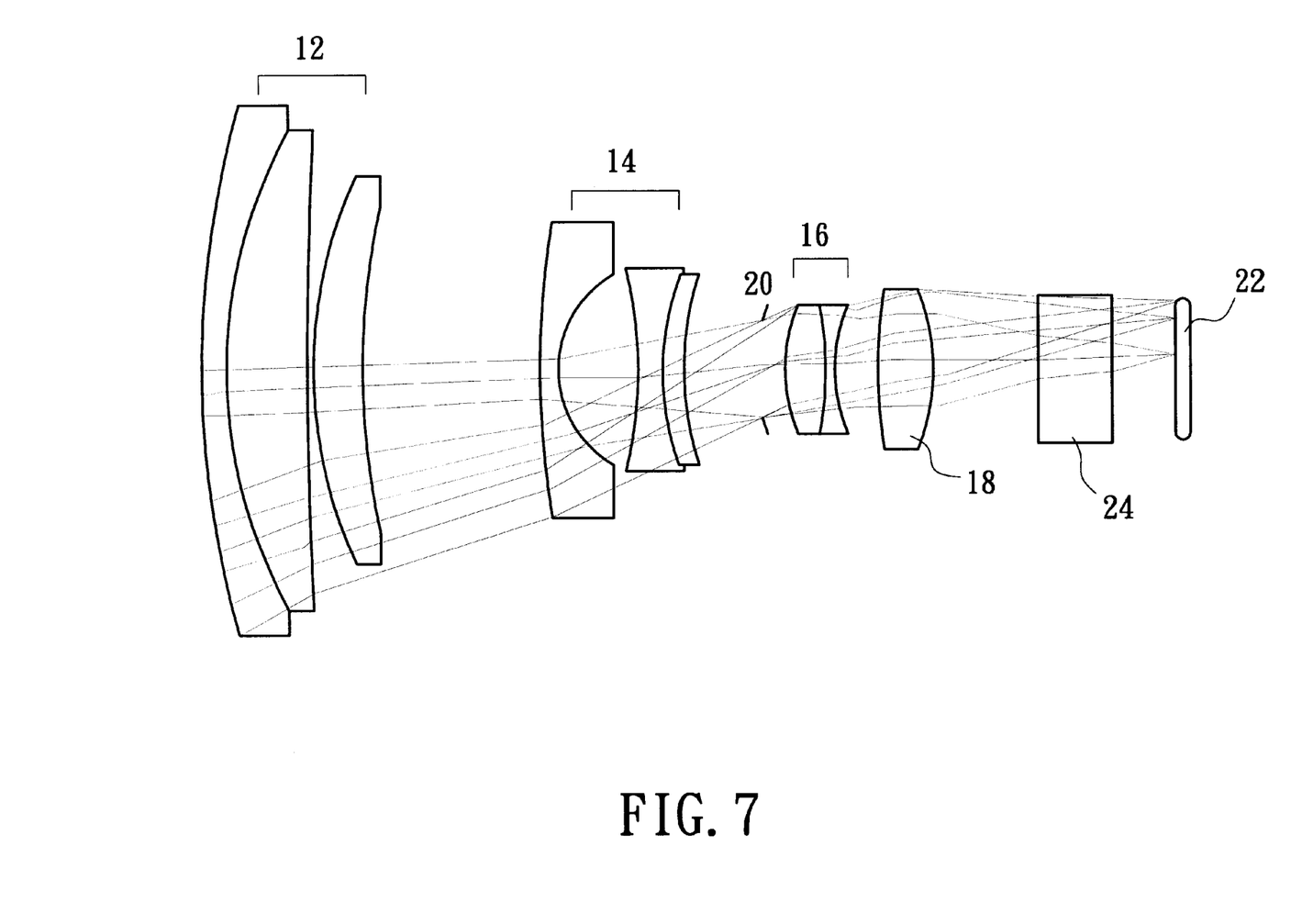
FIG. 7 is a schematic view of the disclosed zoom lens in the telephoto range.
Figure 8:
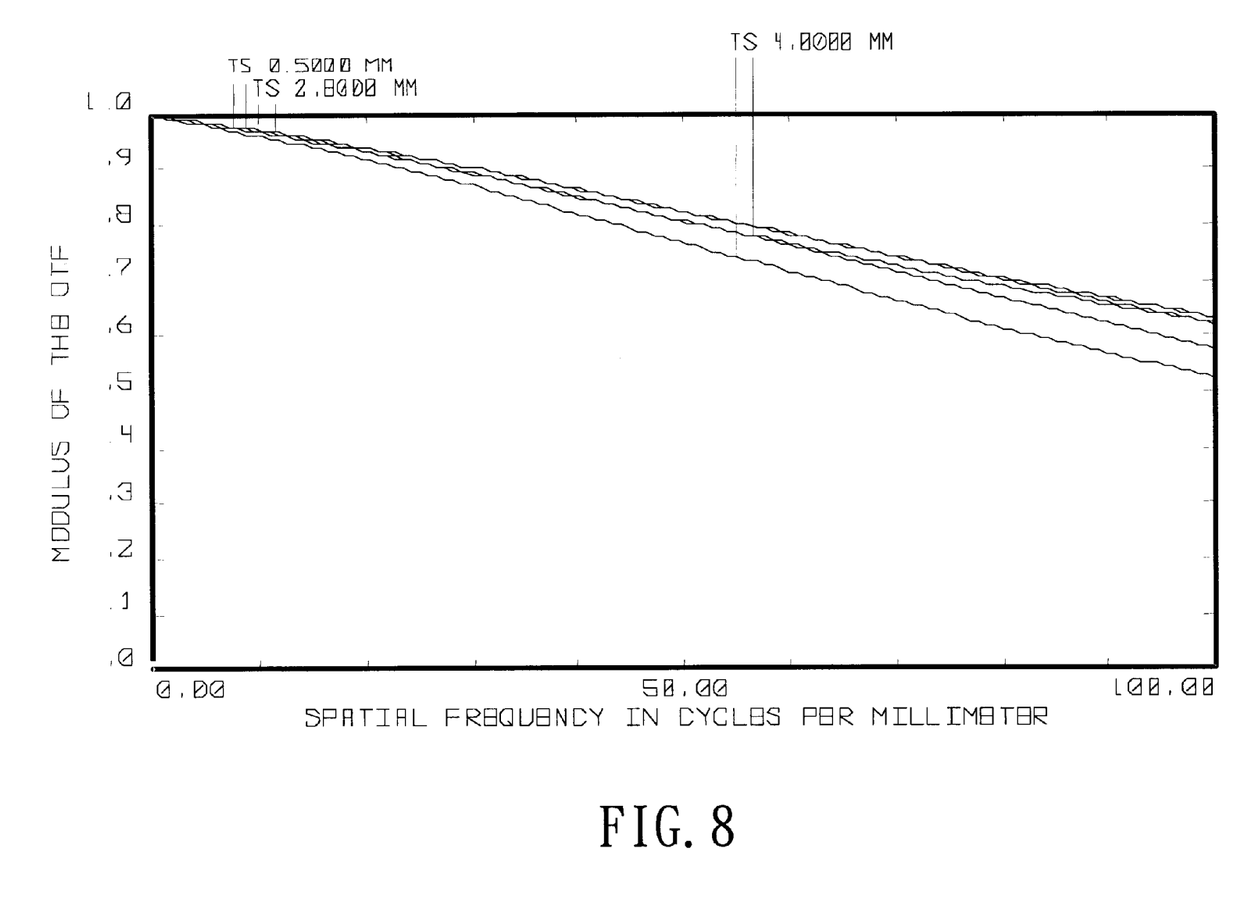
FIG. 8 is a MTF diagram of the disclosed zoom lens in the telephoto range.
Figure 9:
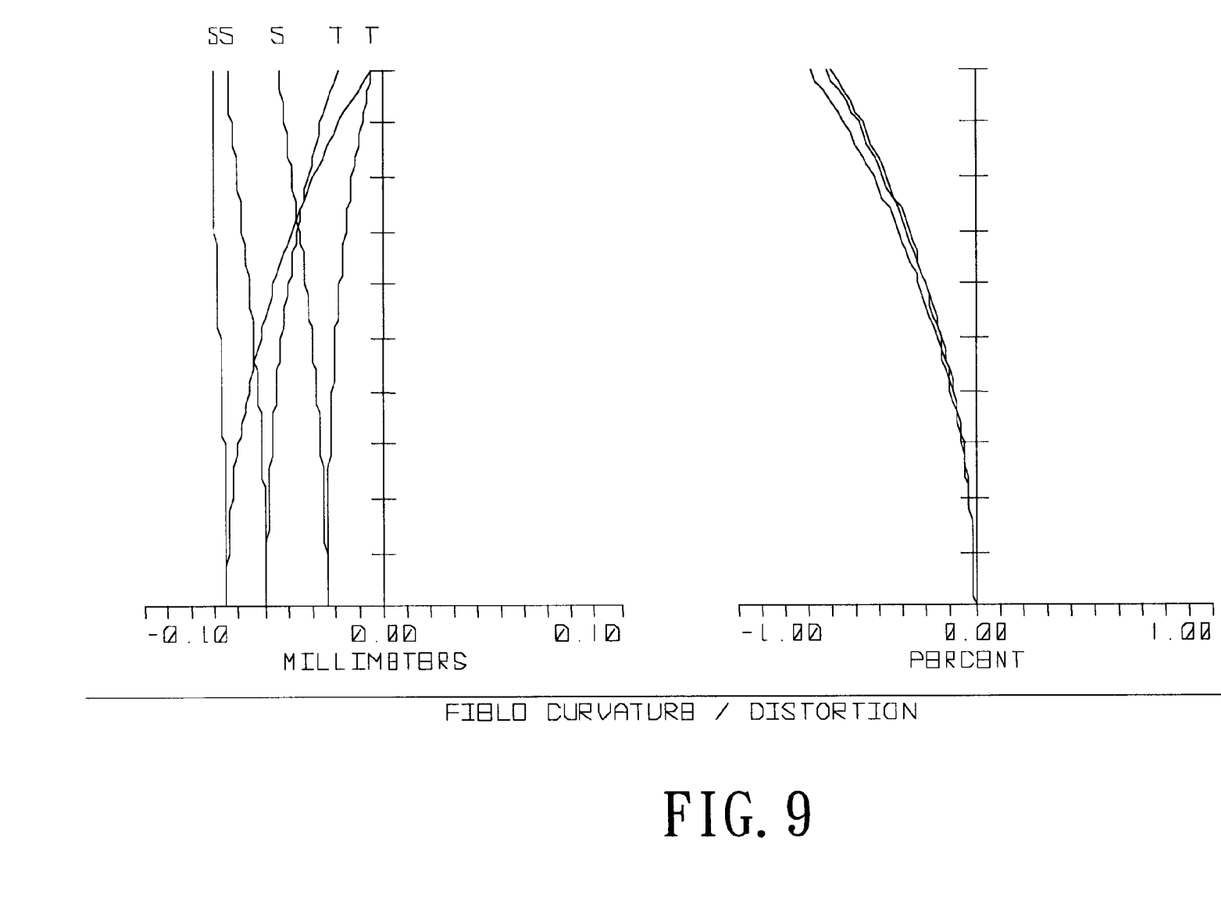
FIG. 9 is the field and distortion diagrams of the disclosed zoom lens in the telephone range.

The MTF, field curvature, and distortion diagrams have been obtained for the zoom lens at varying range, as shown in FIG. 1, FIG. 4, and FIG. 7. These diagrams are revealed in FIGS. 2, 3A and 3B for the zoom lens at the wide range, FIGS. 5, 6A and 6B at the medium range, and FIGS. 8, 9A and 9B at the telephoto lens, respectively.

At explicit embodiment of a 3x digital camera zoom lens according to the invention is shown in TABLE 1 (with the object being at infinity). In Table 1, $R_1$ denotes the curvature radius (in unit of mm) of the with surface from the object surface of the zoom lens, $D_1$ denotes the thickness (in unit of mm) from the with surface to the (i+1)th surface, $N_1$ is the refractive index at the central wavelength $\lambda_d$ (=0.5876 $\mu$m) of the with lens, and $V_1$ is the Abbe number of the with lens.

Similarly, the aspherical lens also satisfies the above conditions. Aspherical surface parameters are shown in TABLE 2. The varying length and the relative distances among the lens groups are shown in TABLE 3.

EFFECTS OF THE INVENTION

The invention has a more compact size and satisfies optical requirement of high resolution. Furthermore, optical lens design using aspherical surface has the following advantages:

1. There are fewer lenses. The invention has nine lenses in the lens group while the conventional spherical lenses usually have 12 to 13 lenses in order to achieve the requirements demanded by a 3x digital camera zoom lens with more than two million pixels.
2. The length of the zoom lens is shorter. Adopting aspherical lens design, the length of a digital camera zoom lens disclosed herein is usually 30% less than a conventional spherical lens.
3. The weight of the zoom lens is lighter.
4. The production cost becomes lower.

The invention being thus described, it will be obvious that the same may be varied in, many ways. Such variations are not to be regarded as a departure from the spirit and scope of the invention, and all such modifications as would be obvious to one skilled in the art are intended to be included within the scope of the following claims.

What is claimed is:

1. A zoom lens, which, starting from an object plane (closest to an object to be shot), comprises:
   a first lens group, which is a positive refractive power lens group;
   a second lens group, which is a negative refractive power lens group;
   a third lens group, which is a positive refractive power lens group; and
   a fourth lens group, which is a positive refractive power lens group;
   wherein the first lens group is held fixed, the zoom lens varies from a short focal length to a long focal length when the second lens group is moved from the object plane toward an image plane, and by independently moving the third lens group and the fourth lens group toward the image plane, and a clear image can be formed on the image plane of the zoom lens.

2. The zoom lens of claim 1, wherein each of the third and the fourth lens groups contains at least on aspherical lens.

3. The zoom lens of claim 2, wherein the variation range of the average Abbe number the fourth lens group, $vp4_{avg}$, satisfies the following condition:

$$52 \leq vp4_{avg} \leq 75.$$

4. The zoom lens of claim 2 further comprising an aperture between the second lens group and the third lens group.

5. The zoom lens of claim 4, wherein the relative position between the aperture and the third lens group is fixed when the focal length of the lens varies.

6. The zoom lens of claim 1, wherein the variation range of the average Abbe number for the positive lenses in the first lens group, for the negative lenses in the second lens group, and for the positive lenses in the fourth lens group, respectively denoted as $vp1_{avg}$, $vn2_{avg}$, and $vp4_{avg}$, have to satisfy the following conditions:

$$50 \leq vp1_{avg} \leq 65,$$
$$50 \leq vn2_{avg} \leq 75,$$
$$52 \leq vp4_{avg} \leq 75.$$

7. The zoom lens of claim 1, wherein the variation range of the transverse magnification for the second, the third, and the fourth lens groups have to satisfy the following conditions:

$$-1.15 \leq \beta 2_{wt} \leq -0.45,$$

$$1.5 \leq \beta 3_{wt} \leq 2.15,$$

$$-0.35 \leq \beta 4_{wt} \leq -0.2$$

$$1.52 \leq \beta 4_t/\beta 4_w \leq \beta 2_t/\beta 2_w \leq 2.5$$

where $\beta 2_{wt}$, $\beta 3_{wt}$, and $\beta 3_{wt}$ denote the variation range of the transverse magnification when the focal length of the lens group varying from the shortest to the longest for the second lens group, for the third lens group, and for the fourth lens group, respectively, $\beta 2_t/\beta 2_w$ and $\beta 4_t/\beta 4_w$ represent the ratio of the transverse magnification at the shor the longest focal length for the second lens group and for the fourth lens group separately.

8. The zoom lens of claim 1, wherein each of the first, the second, and the third lens groups contains cemented lenses.

9. The zoom lens of claim 8, wherein the cemented lens in the third lens group contains an aspherical surface.

10. The zoom lens of claim 1 further comprising an OLPE (Optical Low Pass Filter) to avoid the aliasing effect caused by the high spatial frequencies.

* * * * *